(12) United States Patent
Uchiyama et al.

(10) Patent No.: US 8,911,096 B2
(45) Date of Patent: Dec. 16, 2014

(54) PROJECTION APPARATUS FOR PROJECTING AND PROCESSING AN IMAGE

(75) Inventors: Takayuki Uchiyama, Yokohama (JP); Nobuhiro Fujinawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 323 days.

(21) Appl. No.: 13/133,497

(22) PCT Filed: Nov. 13, 2009

(86) PCT No.: PCT/JP2009/069312
§ 371 (c)(1),
(2), (4) Date: Jun. 8, 2011

(87) PCT Pub. No.: WO2010/067688
PCT Pub. Date: Jun. 17, 2010

(65) Prior Publication Data
US 2011/0242506 A1  Oct. 6, 2011

(30) Foreign Application Priority Data

Dec. 10, 2008  (JP) ................................. 2008-314198
Dec. 10, 2008  (JP) ................................. 2008-314201
Nov. 12, 2009  (JP) ................................. 2009-258490

(51) Int. Cl.
*G03B 21/28*  (2006.01)
*G03B 21/14*  (2006.01)
*G03B 3/06*  (2006.01)
*G03B 21/30*  (2006.01)
*H04N 9/31*  (2006.01)

(52) U.S. Cl.
CPC ............... *G03B 21/14* (2013.01); *G03B 21/28* (2013.01); *G03B 21/30* (2013.01); *H04N 9/3141* (2013.01)
USPC ............................. 353/98; 353/119; 353/71

(58) Field of Classification Search
USPC .............................................. 353/98, 119, 71
See application file for complete search history.

(56) References Cited

U.S. PATENT DOCUMENTS 7,452,084 B2 * 11/2008 Mochizuki ...................... 353/70
2004/0108990 A1   6/2004 Lieberman et al.
(Continued)

FOREIGN PATENT DOCUMENTS

| CN | 1493053 A | 4/2004 |
|---|---|---|
| CN | 101261360 A | 9/2008 |

(Continued)

OTHER PUBLICATIONS

International Preliminary Report on Patentability and Written Opinion issued in Application No. PCT/JP2009/069312 dated Jul. 5, 2011 (w/ English Translation).

(Continued)

*Primary Examiner* — Georgia Y Epps
*Assistant Examiner* — Magda Cruz
(74) *Attorney, Agent, or Firm* — Oliff PLC

(57) ABSTRACT

A projection apparatus comprising a projection unit provided with an optical system that projects an image, a housing that houses the projection unit, a first surface, provided at the housing, that functions as a distance reference surface that defines a distance from a projection window that the housing is provided with to a projection surface that projects the image and as a first placement surface used when setting the housing, and a second surface, provided at the housing, that perpendicularly intersects the first surface and functions as a second placement surface when setting the housing is provided.

6 Claims, 21 Drawing Sheets

(56) References Cited

U.S. PATENT DOCUMENTS

| | | |
|---|---|---|
| 2005/0270496 A1 | 12/2005 | Mochizuki |
| 2007/0279598 A1 | 12/2007 | Hisada et al. |
| 2008/0218037 A1 | 9/2008 | Adachi et al. |
| 2008/0218705 A1 | 9/2008 | Adachi et al. |
| 2008/0218706 A1 | 9/2008 | Adachi et al. |
| 2008/0218707 A1* | 9/2008 | Adachi et al. .................. 353/98 |

FOREIGN PATENT DOCUMENTS

| | | |
|---|---|---|
| JP | A-2003-209727 | 7/2003 |
| JP | A-2003-280091 | 10/2003 |
| JP | A-2003-280105 | 10/2003 |
| JP | A-2005-347790 | 12/2005 |
| JP | A-2007-295049 | 11/2007 |
| JP | A-2007-310194 | 11/2007 |
| JP | A-2007-322811 | 12/2007 |
| JP | A-2008-250281 | 10/2008 |

OTHER PUBLICATIONS

Office Action issued in Japanese Patent Application No. 2008-314201 dated Jan. 15, 2013 (with translation).

International Search Report mailed Dec. 8, 2009 issued in International Patent Application No. PCT/JP2009/069312 (with translation).

Notification of Reason(s) for Refusal dated Jun. 25, 2013 from Japanese Patent Application No. 2009-258490 (with English-language translation).

Nov. 22, 2013 Office Action issued in Chinese Patent Application No. 200980146560.5 (with translation).

Apr. 25, 2014 Office Action issued in Chinese Patent Application No. CN 201210290794.0 (with translation).

* cited by examiner

PROJECTION APPARATUS FOR PROJECTING AND PROCESSING AN IMAGE

TECHNICAL FIELD

The present invention relates to a projection apparatus which projects an image.

BACKGROUND ART

Known in the art is an image projection apparatus which can project an image on a placement surface of the apparatus (for example, see PLT 1).

CITATION LIST

Patent Literature

{PTL 1} Japanese Patent Laid-open Publication (A) No. 2007-310194

SUMMARY OF INVENTION

Technical Problem

In this regard, the image projection apparatus described in PLT 1 is provided with a mirror for reflecting a projected image and a hinge which supports that mirror, so to change the projection size of the image, it is necessary to adjust the mirror angle or hinge height. Further, it is necessary to adjust the focus of the optical system housed in the apparatus, so the operation becomes troublesome.

The object of the present invention is to provide a projection apparatus which enables an image to be projected by an easy operation without requiring various adjustments.

Solution to Problem

The projection apparatus of the present invention is characterized by comprising a projection apparatus comprising, a projection unit having an optical system that projects an image, a housing that houses the projection unit, a first surface, provided on the housing, that functions as a distance reference surface that defines a distance from a projection window that the housing is provided with to a projection surface that projects the image and as a first placement surface that is used when setting the housing, and a second surface, provided on the housing, that perpendicularly intersects the first surface and functions as a second placement surface when setting the housing.

Further, the projection apparatus of the present invention is characterized by comprising a projection apparatus comprising a projection unit having an optical system that projects an image and a housing that houses the projection unit, wherein the projection unit performs an expansion and contraction process on an image projected on a projection surface on which the image is projected while fixing in place one side close to the housing.

Advantageous Effects of Invention

According to the projection apparatus of the present invention, it is possible to project an image by an easy operation without requiring various adjustments.

DESCRIPTION OF EMBODIMENTS

Figure 1:
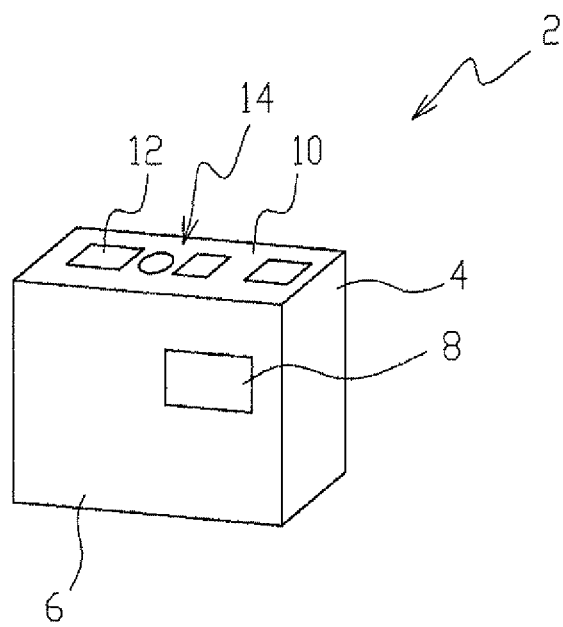
FIG. 1 is a perspective view showing the appearance of a projector according to a first embodiment.

Below, referring to the drawings, a projection apparatus according to a first embodiment of the present invention will be explained. FIG. 1 is a perspective view showing the appearance of a projector 2 embodying a projection apparatus according to the first embodiment. As shown in FIG. 1, the projector 2 is provided with a housing 4 comprised of a metal or plastic. A front surface 6 of the housing 4 is provided with a projection window 8 of a projection unit 30 which is built into the housing 4 (see FIG. 4). Further, a top surface 10 of the projector 2 is provided with a power switch 12 and an operating panel 14 for setting various functions. Note that the side surfaces of the housing 4 are provided with various input terminals, vents for cooling air, etc. (not shown).

Figure 2:
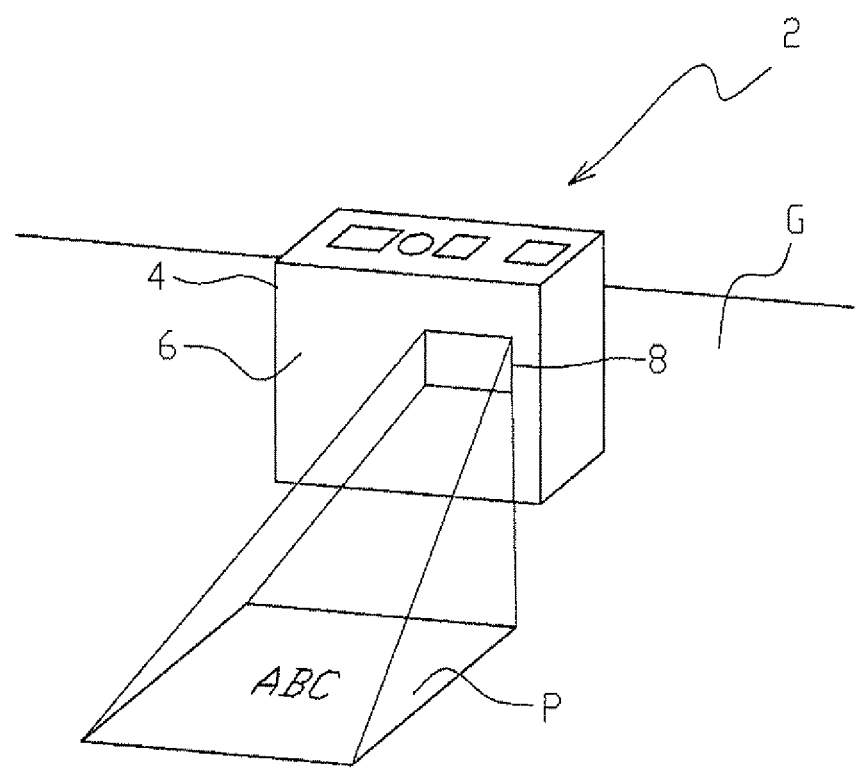
FIG. 2 is a perspective view showing a first state of a projector according to the first embodiment at the time of image projection.

FIG. 2 is a perspective view showing a first state of the projector 2 at the time of image projection. As shown in FIG. 2, the projector 2 is set standing up so that the surface which is opposite to the top surface 10 of the housing 4, that is, the bottom surface, is contiguous with a horizontal surface G. Further, from the projection window which is provided at the front surface of the housing 4, projection light is projected obliquely downward whereby a projected image P is projected on the horizontal surface G. Note that, the horizontal surface G is a surface of a desk or other horizontal or substantially horizontal surface.

Here, the bottom surface of the housing 4 functions as a placement surface which is used when setting the housing 4 and functions as a distance reference surface which defines a distance from the projection window 8 which is provided at the front surface 6 of the housing 4 to the projection surface of the projected image P, that is, the horizontal surface G. That is, by the housing 4 being set on the horizontal surface G with its bottom surface facing down, the distance from the projection window 8 which is provided at the front surface 6 of the housing 4 to the placement surface G is unambiguously determined. Further, at this time, the distance reference surface constituted by the bottom surface of the housing 4 and the projection surface on which the projected image P is projected constituted by the horizontal surface G are parallel with each other. By the projection distance of the image by the projector 2 being unambiguously determined in this way, the optical members in a later explained projection unit 30 are fixed in place in advance at predetermined positions in the projection unit 30 so that a clear projected image can be formed at a location exactly that projection distance away.

Figure 3:
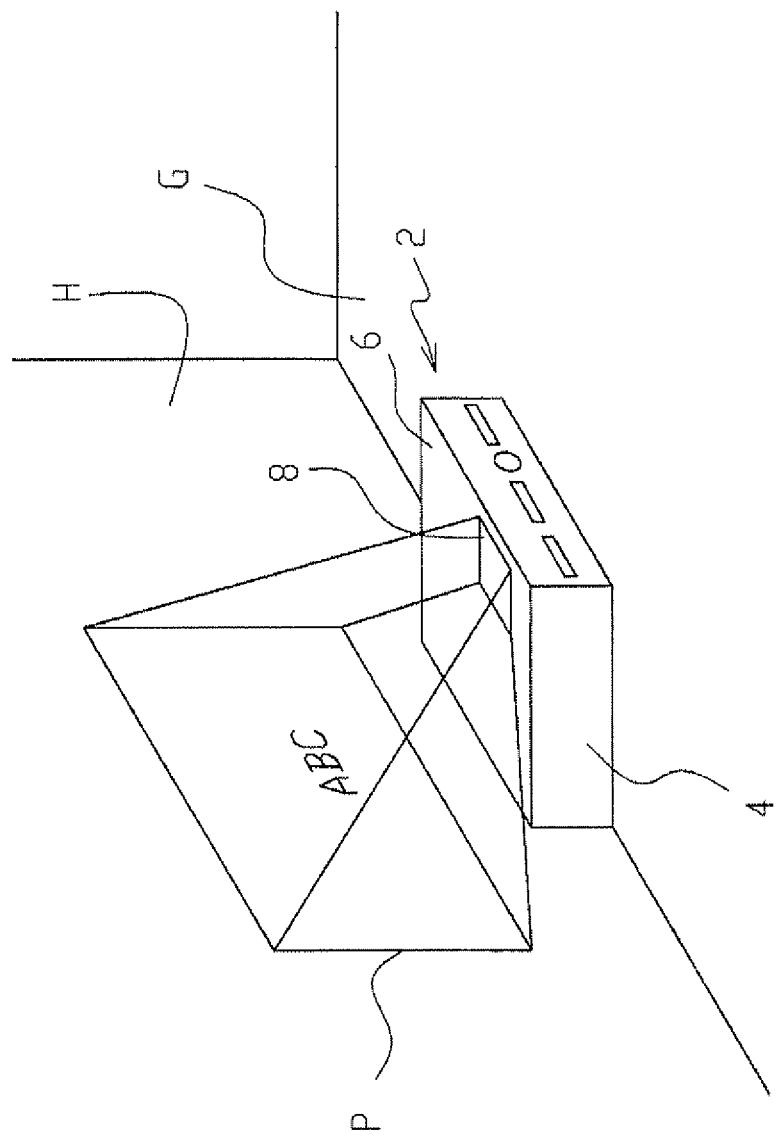
FIG. 3 is a perspective view showing a second state of a projector according to the first embodiment at the time of image projection.

FIG. 3 is a perspective view showing a second state of the projector 2 embodying the projection apparatus according to this embodiment at the time of image projection. As shown in FIG. 3, the projector 2 is set so that the surface opposite to the front surface 6 of the housing 4, that is, the back surface, is contiguous with the horizontal surface G and so that the bottom surface is contiguous with a surface vertical to the horizontal surface G, that is, a wall surface H. Further, from the projection window which is provided at the front surface of the housing 4, projection light is projected obliquely upward whereby a projected image P is projected on the wall surface H.

Here, the back surface of the housing 4 functions as the placement surface which is used when setting the housing 4, while the bottom surface functions as a distance reference surface which defines a distance from the projection window 8 which is provided at the front surface 6 of the housing 4 to the projection surface of the projected image P, that is, the wall surface H. That is, by the housing 4 being set on the horizontal surface G with its back surface facing down and by it being set so that the bottom surface is contiguous with the wall surface H, the distance from the projection window 8 which is provided at the front surface 6 of the housing 4 to the wall surface H is unambiguously determined. Further, at this time, the distance reference surface constituted by the bottom surface of the housing 4 and the projection surface upon which the projected image P is projected constituted by the wall surface H are parallel with each other. In this way, even if setting the housing 4 on the horizontal surface G to project an image on the wall surface H, the projection distance of the image is unambiguously determined.

Figure 4:
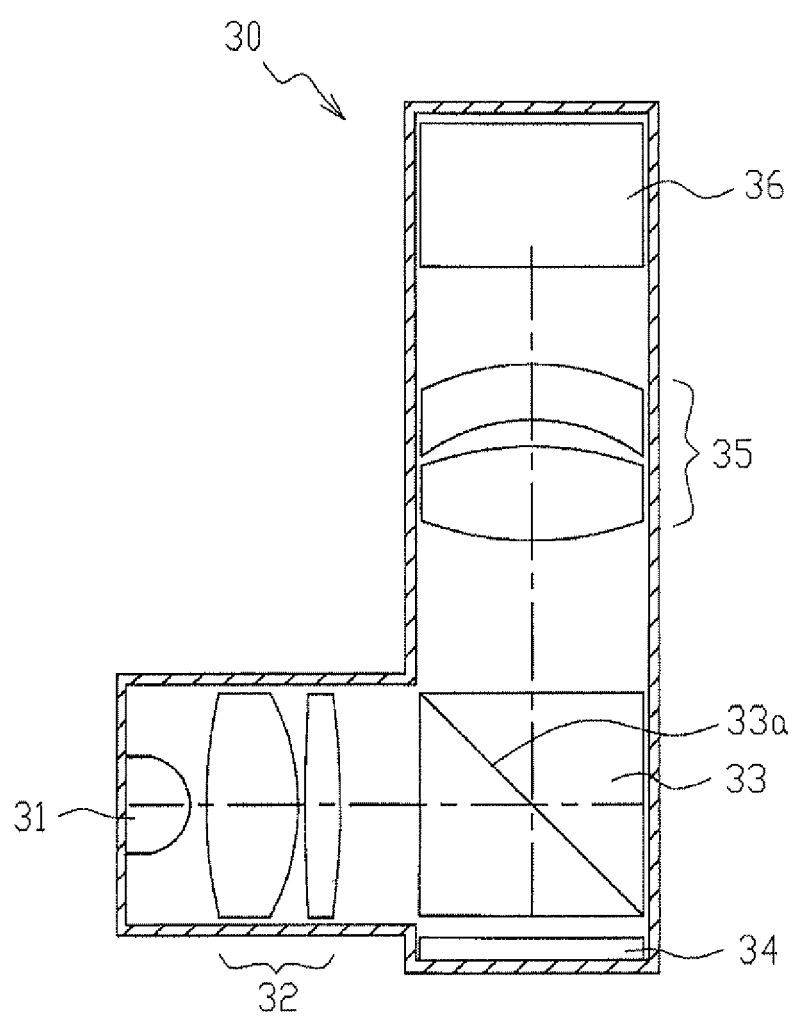
FIG. 4 is a cross-sectional view showing the configuration of the inside of a projection unit according to the first embodiment.

FIG. 4 is a cross-sectional view showing the configuration of the inside of a projection unit 30 provided in the projector 2 according to this embodiment. Here, the projection unit 30 is a unit of an oblique projection system including a projecting lens group 35 and mirror 36. Note that, FIG. 4 is a cross-sectional view seen from the front of the projection unit 30, that is, the front surface side of the housing 4 of the projector 2. Projected light which is emitted from a light source which emits projected light, that is, an LED 31, is converted to parallel light by the focusing lens group 32, then strikes a PBS (polarized beam splitter) 33 and is irradiated to a polarized light separation film 33a which is provided at an angle of 45° with respect to the direction of progression of the incident light. In the irradiated projected light, only the S polarized light is reflected by the polarized light separation film 33a, is emitted from the bottom surface of the PBS 33 downward, then strikes an image display unit which is set below the PBS 33, that is, a normally black type LCOS (reflection type liquid crystal device) 34. On the other hand, the P polarized light which passes through the polarized light separation film 33a strikes the side surfaces of the PBS 33, which have been treated with non-reflective process such as blackening process, and is absorbed.

The light striking the LCOS 34 is reflected by the LCOS 34 and again strikes the PBS 33. Here, a not shown liquid crystal layer forming the LCOS 34 functions as a phase plate with respect to the incident light when voltage is applied. Therefore, in the light which is emitted from the LCOS 34, light which passes through a pixel region to which voltage is applied from the liquid crystal layer is converted from S polarized light to P polarized light. On the other hand, in the light which is emitted from the LCOS 34, light which passes through a pixel region to which voltage is not applied from the liquid crystal layer proceeds as is as S polarized light.

In the light which is emitted from the LCOS 34 and again strikes the PBS 33, only the P polarized light which passes through a pixel region of the LCOS 34 where voltage is applied passes through the polarized light separation film 33a and is thereby separated from the S polarized light. That P polarized light is emitted from the PBS 33 upward, then passes the projecting lens group 35 for projecting the optical image for projection and the mirror 36 for deflecting the direction of projection of the optical image which is emitted from the projecting lens group 35, is emitted from the projection unit 30, and is projected through the projection window 8 which is provided at the front surface 6 of the housing 4 of the projector 2.

Here, the mirror 36 is comprised of a curved mirror which has a predetermined curvature rate so as to enable keystone correction of the projected image P which is projected on the projection surface. Further, all of the optical members forming the projection optical system in the projection unit 30 are fixed in place with respect to the projection unit 30. As explained above, in the projector 2 according to this embodiment, the projection distance of the image is unambiguously determined when setting the projector 2 on the horizontal surface G, so the optical members in the projection unit 30 can be fixed in place in advance at predetermined positions so that a clear projected image can be formed at a position exactly that projection distance away.

Figure 5:
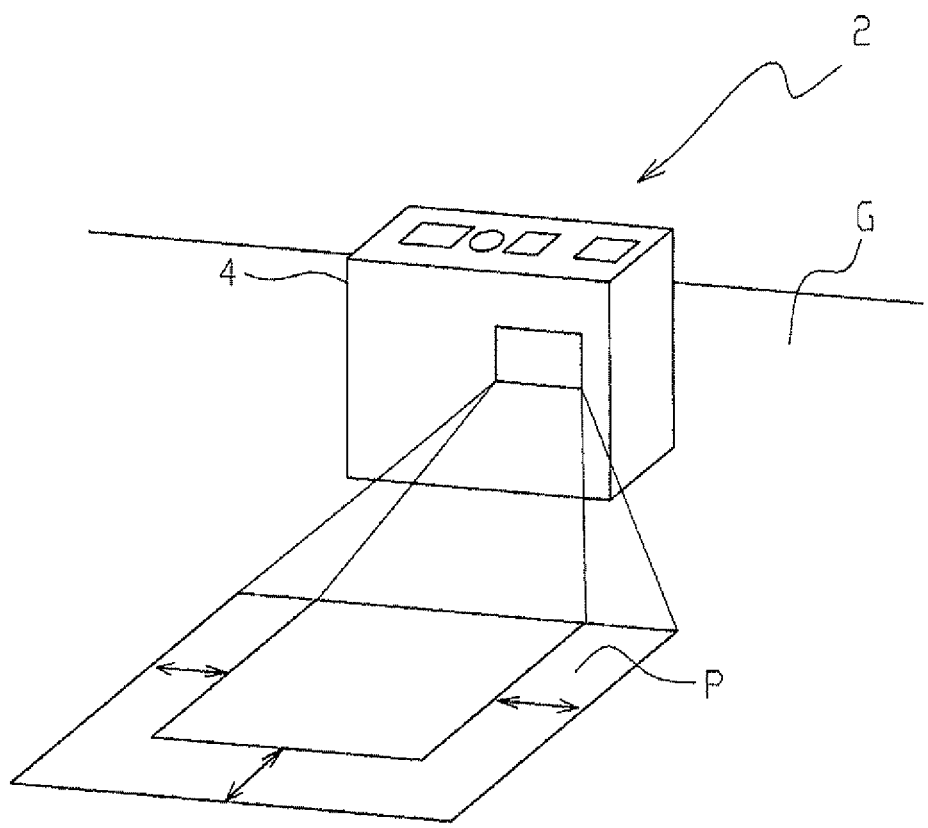
FIG. 5 is a perspective view showing an expansion and contraction process of a projector according to the first embodiment at the time of image projection.

Next, the scaling of the size of the projected image by the projection apparatus according to this embodiment will be explained using FIG. 5. FIG. 5 is a view showing the state when an image which is being projected by the projector 2 is scaled. As shown in FIG. 5, when the projected image P which is being projected on the projection surface G is to be enlarged or reduced, this is done while fixing in place the side of the projected image P which is closest to the housing 4. By scaling the image in this way, it is possible to minimize the projection region of the image which is required. That is, according to this projector 2, in many cases the image is projected onto the surface of a desk or another surface where the image projection region is relatively small, so by scaling the projected image P in this way, it is possible to prevent the image projection region from being enlarged without control. Further, the position serving as the reference point for the scaling can be easily recognized by the user, so user friendliness becomes better as well.

Here, the projected image P is scaled by having the image which is to be displayed on the LCOS 34 of the projection unit 30 scaled while maintaining the aspect ratio in the state where one side, corresponding to the above one side of the projected image P, is fixed in place. The optical members which are housed in the projection unit 30 are all fixed in place with respect to the projection unit 30, so the projected image P is scaled by such electrical control.

Figure 6:
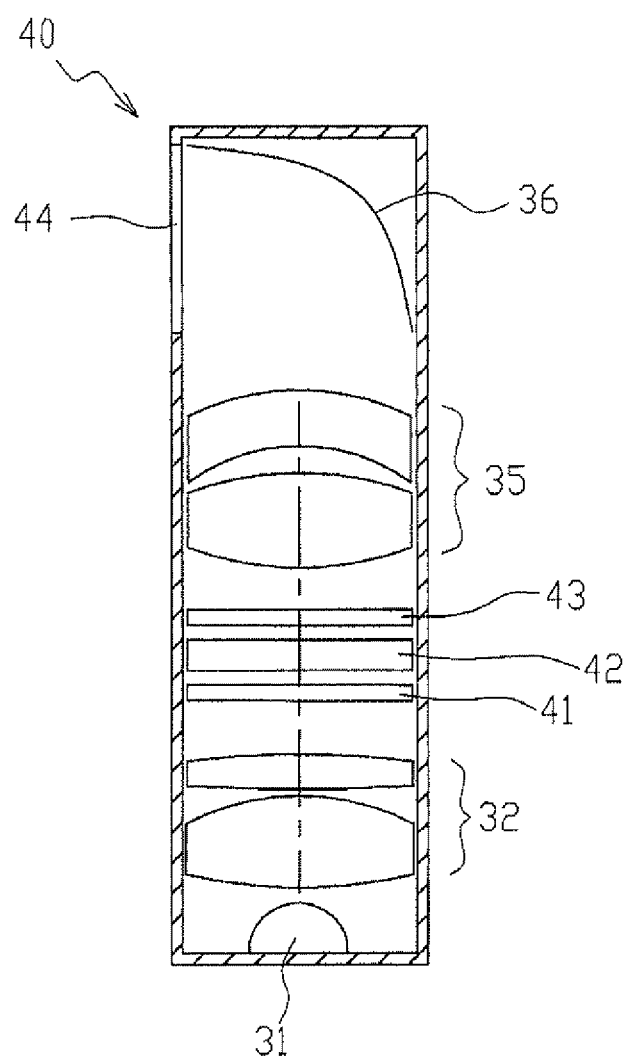
FIG. 6 is a cross-sectional view showing the configuration of the inside of a projection unit according to a second embodiment.

Note that, the projector 2 according to the embodiment of the present invention may be provided with, instead of the projection unit 30, another projection unit 40 shown in FIG. 6. This projection unit 40 is provided inside the unit with an image display unit constituted by a transmission type liquid crystal display, but otherwise is provided with a configuration similar to the projection unit 30. Therefore, in the explanation of the projection unit 40, explanations of parts of the configuration the same as in the projection unit 30 are omitted. Further, in the explanation of the projection unit 40, parts of the configuration the same as in the projection unit 30 are assigned the same reference notations.

FIG. 6 is a cross-sectional view showing the configuration of the inside of the projection unit 40. Note that, FIG. 6 is a cross-sectional view when viewing the projection unit 40 from the horizontal direction, that is, from the side surface side of the housing 4 of the projector 2. As shown in FIG. 6, the unit 40, which has a rectangular cross-section, is provided with, from the bottom, an LED 31, focusing lens group 32, first polarizer 41 which passes only the P polarized light component of the projected light, an image display device constituted by an LCD (transmission type liquid crystal display) 42, second polarizer 43 which passes only the S polarized light component of the projected light, projecting lens group 35, and mirror 36.

The unpolarized light which is emitted from the LED 31 upward and is converted by the focusing lens group 32 to parallel light, that is, the projected light, is converted by the first polarizer 41 to straight polarized light of P polarized light, then strikes the LCD 42. Here, in the pixel regions forming the LCD 42, the light which passes through a pixel region where voltage is not applied is converted from P polarized light to S polarized light. On the other hand, the light which passes through a pixel region where voltage is applied changes in polarization characteristics and is emitted as is as P polarized light. In the projected light, which is emitted from the LCD 42 as mixed light of P polarized light and S polarized light, only the S polarized light passes through the second polarizer 43 to strike the projecting lens group 35. The projected light which is emitted from the projecting lens group 35 is reflected at the mirror 36 comprised of the curved mirror and is deflected in projection direction. Further, the projected image is subjected to keystone correction and projected from the projection window 44 of the projection unit 40.

Note that, in the same way as the above-mentioned projection unit 30, all of the optical members which form the projection optical system in the projection unit 40 are also fixed in place with respect to the projection unit 40. As explained above, in the projector 2 according to this embodiment, the projection distance of the image is unambiguously determined when setting the projector 2 on the horizontal surface G, so the optical members in the projection unit 40 can be fixed in place in advance at predetermined positions so that a clear projected image is formed at a position exactly that projection distance away.

According to the projection apparatus according to the first embodiment, by using the placement surface provided at the housing so as to set the housing on a horizontal surface, the distance from the projection window provided at the housing to the projection surface where the image is projected is unambiguously determined, so it is possible to arrange all of the optical members of the optical system provided in the projection unit fixed in place with respect to the projection unit. Therefore, there is no need for a focus adjusting mechanism etc., and the projection unit, and in turn the projection apparatus, can be simplified in mechanism, made lighter in weight, made smaller in size, and cut in cost. Further, since there are no moving parts, it is possible to prevent a drop in precision of the projection optical system and thereby improve the reliability. Also, it is possible to project a clear image without focus adjustment or other operations at the time of use of the apparatus, so the user friendliness is greatly improved.

Further, according to the projection apparatus according to the first embodiment, the projection unit scales the projected image while fixing in place one side close to the housing of the projection apparatus, so it is possible to easily change the size of the projected image and possible to minimize the image projection region required.

Due to the above, according to the projection apparatus according to the first embodiment, it is possible to project an image by an easy operation without requiring various adjustments.

Figure 7:
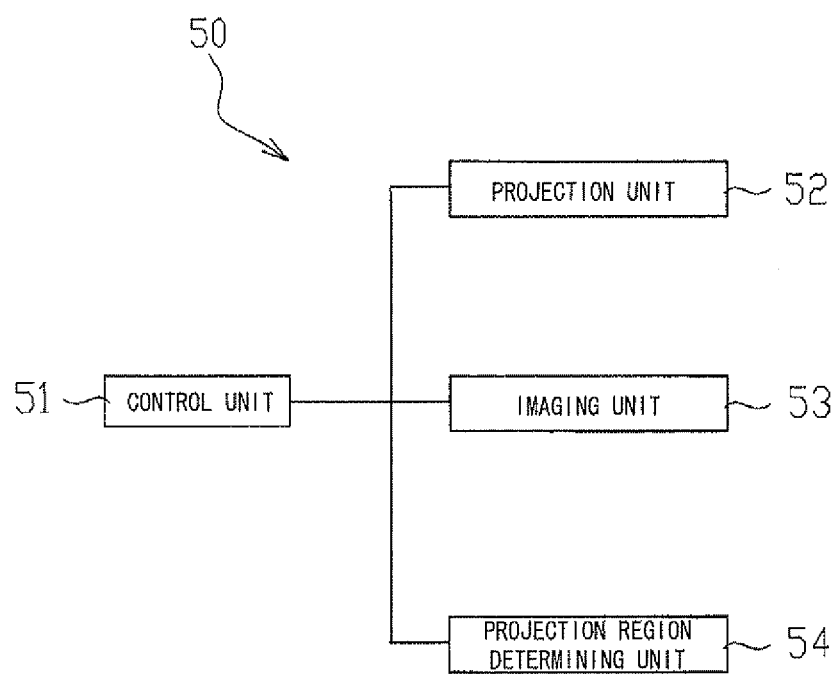
FIG. 7 is a block diagram showing the configuration of a projector according to the second embodiment.
Figure 8:
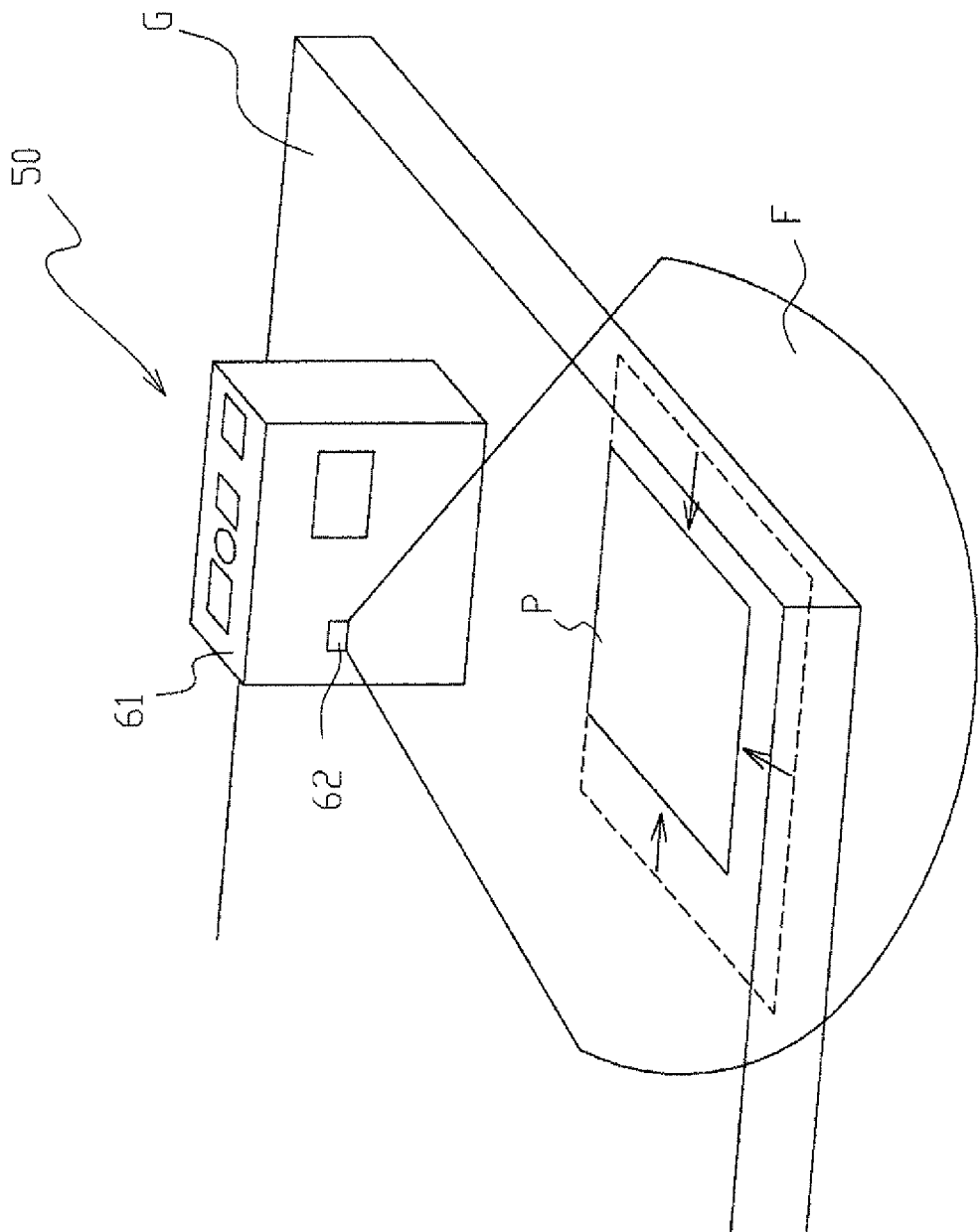
FIG. 8 is a perspective view showing a state of a projector according to the second embodiment at the time of image projection.

Next, referring to the drawings, a projection apparatus according to a second embodiment of the present invention will be explained. FIG. 7 is a block diagram showing the general configuration of a projector 50 embodying a projection apparatus according to the second embodiment, while FIG. 8 is a perspective view showing the state when the projector 50 projects an image. As shown in FIG. 7, the projector 50 is provided with a control unit 51 which controls the functions of the different units overall and a projection unit 52 which has the same configuration as the projection unit 30 provided in the above-mentioned projector 2 and is provided with an imaging unit 53 which captures light striking it through an imaging window 62 which is provided at the front surface of the housing 61 of the projector 50 (see FIG. 8). Further, the projector 50 is provided with a projection region determining unit 54 which determines the projection region on which to project the image based on the image captured at the imaging unit 53.

As shown in FIG. 8, the imaging unit 53 captures a front region F, including the projection region of the projected image to be projected by the projection unit 52, from the imaging window 62 which is provided at the front surface of the housing 61. The projection region determining unit 54 uses the captured image as the basis to determine the projection region to project the image. For example, as shown in FIG. 8, when the projector 50 is set on the surface of a desk and the projection region is restricted by the shape of the desk (ends), the projection region determining unit 54 uses the captured image which captures the front region F of the housing 61 as the basis to determine the projection region so that the projection region of the projected image P does not extend beyond the surface of the desk.

When the projection region is determined, the control unit 51 sends a control signal to the projection unit 52 and instructs it to project the projected image P so as to fit in that projection region. That is, the projection unit 52 displays the image which is to be displayed at the LCOS 34 by a suitable size and electrically controls the image size so as to fit in that projection region. Note that, the above processing for determination of the image size may be performed before projection of the projected image P or may be performed simultaneously with projection of the projected image P, that is, as shown in FIG. 8, so as to change the size of the projected image P which is first projected, shown by the dotted line in the figure, to the size after correction, shown by the solid line.

According to the projection apparatus according to the second embodiment, an imaging unit which captures the projection surface and a projection region determining unit which uses the captured image of the projection surface which was captured by the imaging unit so as to determine a projection region at which an image can be projected by the projection unit are provided. Since the projection unit projects the image within a determined projection region, it is possible to project a projected image by an image size optimized for the surface of a desk or other projection surface with a limited projection region.

Figure 9:
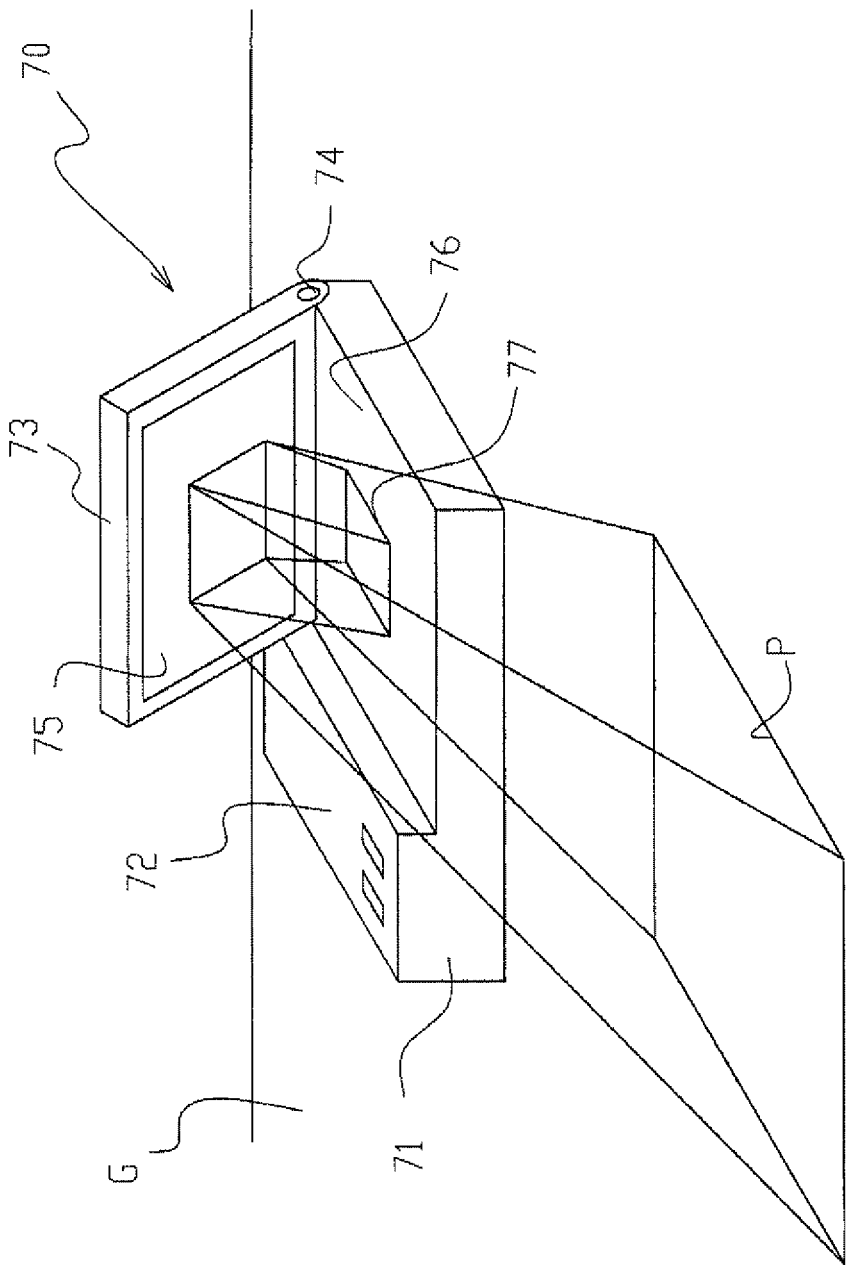
FIG. 9 is a perspective view showing a first state of a projector according to a third embodiment at the time of image projection.

Next, referring to the drawings, a projection apparatus according to a third embodiment of the present invention will be explained. FIG. 9 is a perspective view showing a first state of a projector 70 embodying a projection apparatus according to the third embodiment at the time of image projection. As shown in FIG. 9, the projector 70 is provided with a housing 71 comprised of a metal or plastic. At the top of the housing 71, a top surface 72 on which a power switch and an operating panel for setting various functions etc. are provided and a cover 73 which is provided to be able to be opened upward and closed are provided. At the time of use of the projector 70, automatically or manually, the cover 73 is turned by exactly a predetermined angle around a shaft 74 to make it open and expose a mirror 75 which is set at the bottom side of the cover 73. Note that the angle is an angle determined in advance and is never changed. When the cover 73 is opened, a projection window 77 which is provided at the center of a second top surface 76 of the housing 71 is exposed. The projector 70 has a not shown projection unit inside of the housing 71. The projected image P which is projected from that projection unit passes through the projection window 77, is reflected at the mirror 75, and is projected on the horizontal surface G on which the housing 71 is set.

The projector 70 is set on the horizontal surface G so that the surface opposite to the top surface 72 of the housing 71, that is, the bottom surface, is contiguous with the horizontal surface G. Here, that bottom surface functions as the placement surface used when setting the housing 71 and functions as a distance reference surface which defines the distance from the projection window 77 of the housing 71 to the projection surface of the projected image P, that is, the horizontal surface G. That is, by the housing 71 being set on the horizontal surface G with its bottom surface facing down, the distance from the projection window 77 of the housing 71 to the horizontal surface G is unambiguously determined. Further, at this time, the distance reference surface constituted by the bottom surface of the housing 71 and the projection surface on which the projected image P is projected constituted by the horizontal surface G are parallel with each other. By the projection distance of the image by the projector 70 being unambiguously determined in this way, the optical members in the above-mentioned projection unit housed in the housing 71 are fixed in place in advance at predetermined positions in the projection unit so that a clear projected image can be formed at a location exactly that projection distance away.

Figure 10:
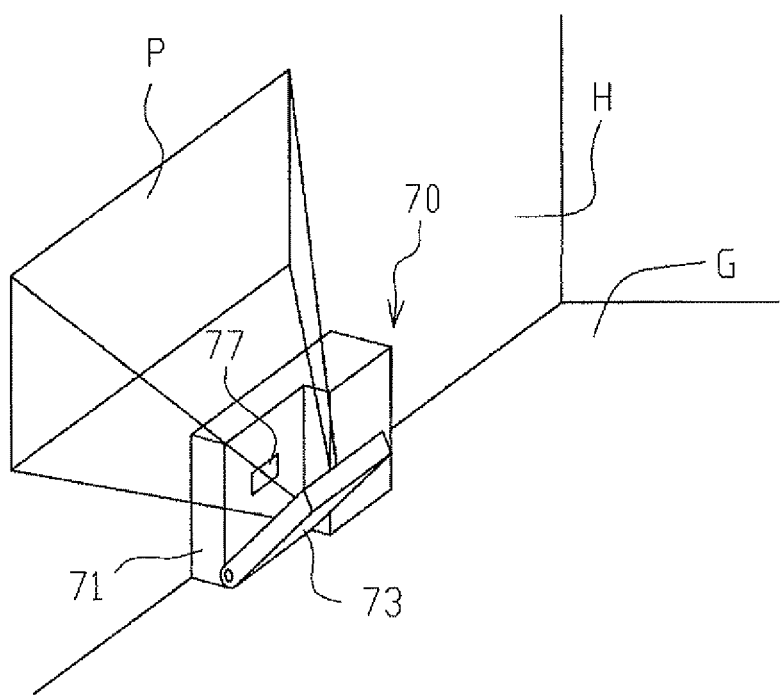
FIG. 10 is a perspective view showing a second state of a projector according to the third embodiment at the time of image projection.

FIG. 10 is a perspective view showing a second state of the projector 70 embodying the projection apparatus according to this embodiment at the time of image projection. As shown in FIG. 10, the projector 70 is set so that the back surface of the housing 4 is contiguous with the horizontal surface G and so that the bottom surface is contiguous with a surface vertical to the horizontal surface G, that is, a wall surface H. Further, a projected image P which is projected from the projection window 77 which is provided at the housing 71 is reflected at the mirror 75 which is provided at the cover 73 of the housing 71 (not shown in FIG. 10), then is projected on the wall surface H.

Here, the back surface of the housing 71 functions as the placement surface used when setting the housing 71, while the bottom surface functions as a distance reference surface which defines the distance from the projection window 77 of the housing 71 to the projection surface of the image, that is, the wall surface H. That is, by the housing 71 being set on the horizontal surface G with its back surface facing down and the bottom surface being set contiguous with the wall surface H, the distance from the projection window 77 provided at the housing 71 to the wall surface H is unambiguously determined. Further, at this time, the distance reference surface constituted by the bottom surface of the housing 71 and the projection surface on which the projected image P is projected constituted by the wall surface H are parallel with each other. In this way, even when setting the housing 71 on the horizontal surface G to project the image on the wall surface H, the projection distance of the image is unambiguously determined.

According to the projection apparatus according to the third embodiment, it is possible to project an image by an easy operation without requiring various adjustments.

Note that each of the projection units according to the above-mentioned embodiments is provided with a mirror 36 which is comprised of a curved mirror having a predetermined curvature rate and which has a concave shaped reflecting surface such as shown in FIG. 6, but instead of the mirror 36, it is also possible to provide a mirror which is comprised of a free form curved mirror and which has a concave shaped reflecting surface.

Figure 11:
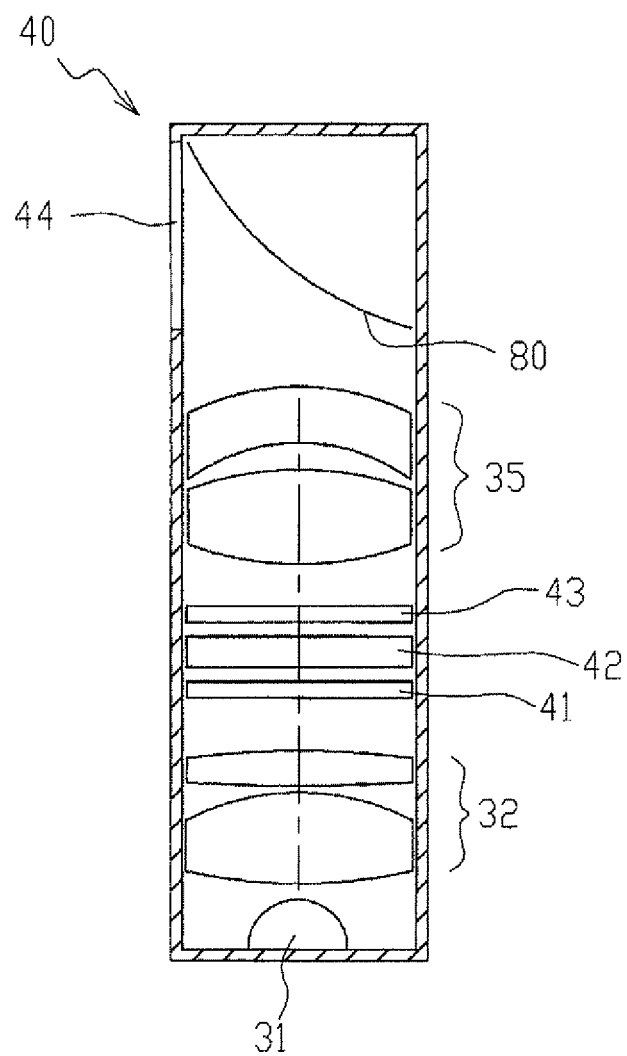
FIG. 11 is a cross-sectional view showing the configuration of the inside of another projection unit.

Further, instead of the mirror 36, it is also possible to provide a mirror 80 which is comprised of a free form curved mirror and which has a convex shaped reflecting surface such as shown in FIG. 11. When proving such a convex mirror 80, compared with when providing a concave mirror 36 which requires formation of an intermediate image, there is no need to provide a mechanism for forming an intermediate image etc. and therefore lighter weight, smaller size, reduced cost, etc. of the projection unit and in turn the projection apparatus can be realized.

Further, at least one surface of each of the optical members forming the projection optical system in the projection unit may be comprised of a free form curved surface. In this case, since all of the optical members which form the projection optical system in the projection unit are fixed in place with respect to the projection unit, it is possible to prevent a drop in precision of the optical members which have the free form curved surfaces and possible to easily form a distortion-free projected image.

Figure 12:
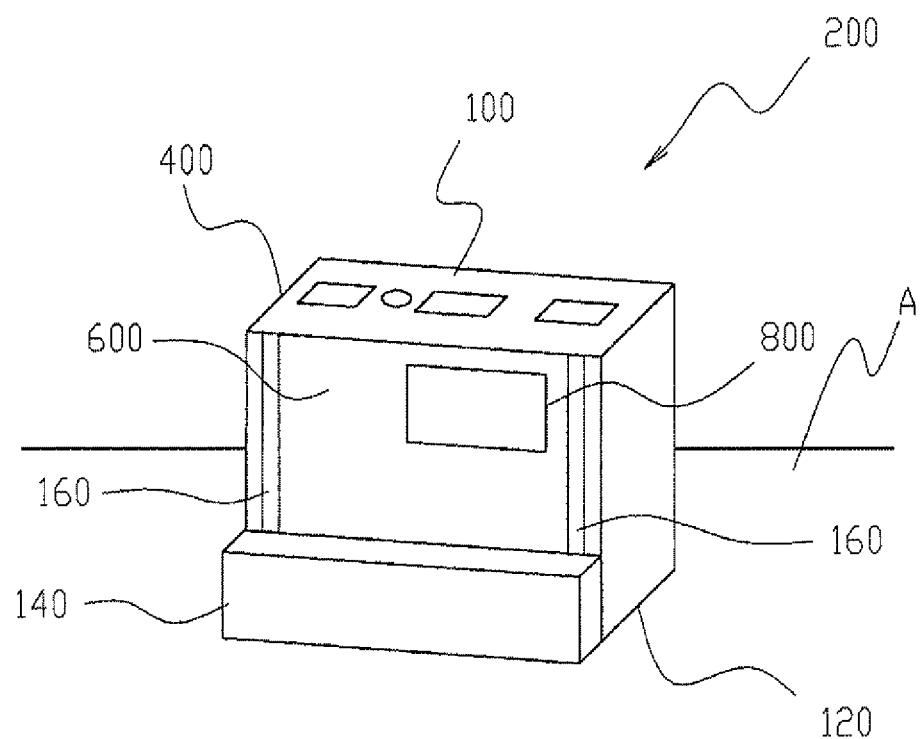
FIG. 12 is a perspective view showing the appearance of a projector according to a fourth embodiment at the time of image projection.
Figure 12:
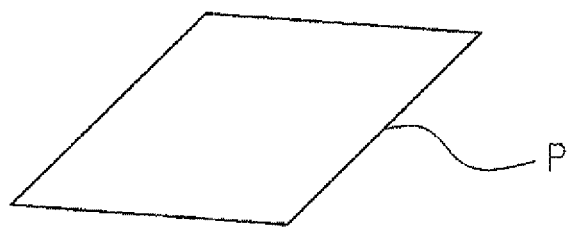

Next, referring to the drawings, a projection apparatus according to a fourth embodiment of the present invention will be explained. FIG. 12 is a perspective view showing the appearance at the time of image projection in a projector 200 embodying a projection apparatus according to the fourth embodiment. As shown in FIG. 12, the projector 200 is set standing up on a projection surface A and, in that state, projects a projected image P on the projection surface A. This projector 200 is provided with a housing 400 inside of which a projection unit 500 (see FIG. 14) is housed. A front surface 600 of the housing 400 is provided with a projection window 800. The image which is projected from the projection unit 500 is projected from this projection window 800 toward the front of the housing 400 and forms a projected image P on the projection surface A. Further, the top surface 100 of the housing 400 is provided with an operating panel for setting functions of the projector 200 etc. Note that, in the projector 200 according to this embodiment, the bottom surface 120 of the housing 400 functions as the placement surface which is contiguous with the projection surface A.

As shown in FIG. 12, the projector 200 is provided, on the front surface 600 of the housing 400, with a cover 140 which functions as a protective member which protects the projection window 800. This cover 140 is set to be able to slide in the vertical direction through a pair of slide rails 160, 160 arranged near the two ends of the front surface 600 of the housing 400 in the width direction. As shown in FIG. 12, when using the projector 200 to project an image, the cover 140 is slid to the bottommost part of the front surface 600 of the housing 400 to position it at a projection position which exposes the projection window 800 and to make the bottom end face of the cover 140 abut against the projection surface A. By arranging the cover 140 at this position, it is possible to complementarily support the housing 400 which is set on the projection surface A using the cover 140.

Figure 13:
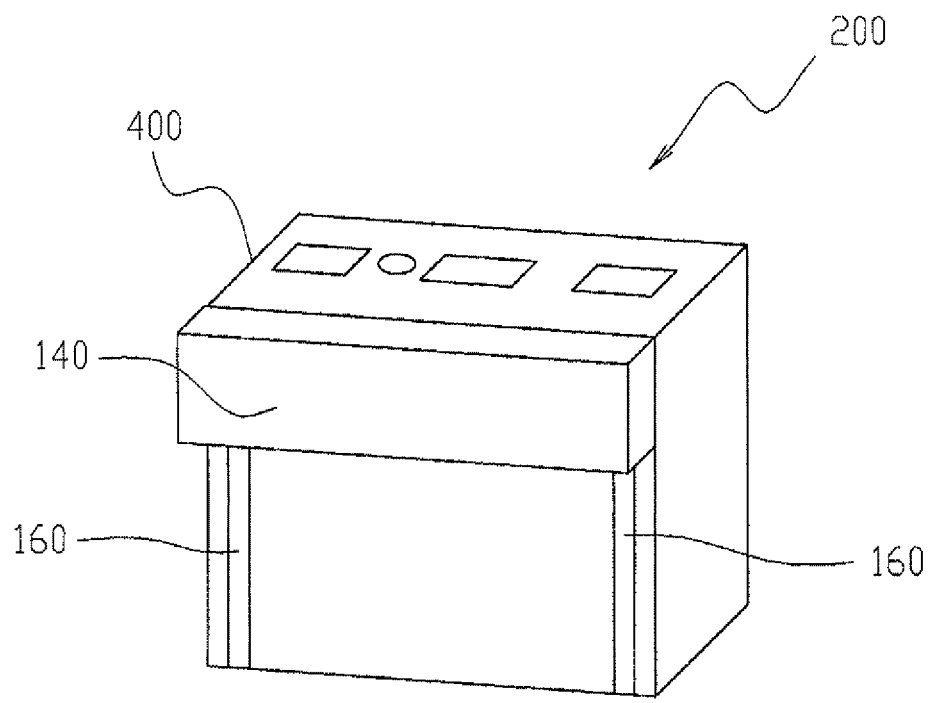
FIG. 13 is a perspective view showing the appearance of a projector according to the fourth embodiment at the time of non-image projection.

FIG. 13 is a perspective view showing the appearance of the projector 200 according to this embodiment at the time of non-image projection. As shown in FIG. 13, the cover 140 which is attached to the front surface 600 of the housing 400 is slid to the topmost position on the front surface 60 in this state and is positioned at a storage position which completely closes and protects the projection window 600 which is set at the front surface 600. By protecting the projection window in this way, the user of the projector 200 can safely carry around the projector 200.

Figure 14:
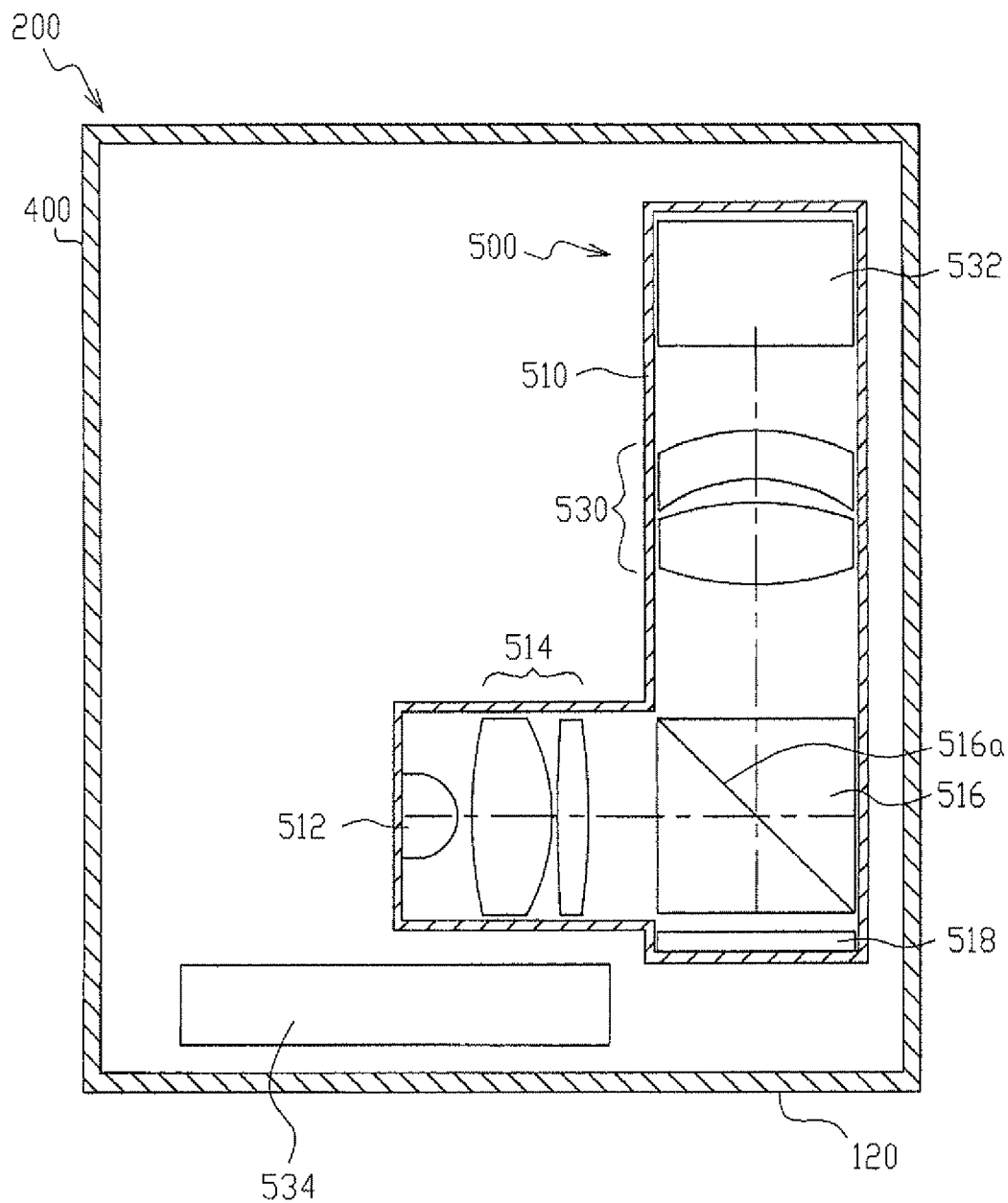
FIG. 14 is a cross-sectional view showing the configuration of the inside of a projection unit according to the fourth embodiment.

FIG. 14 is a front cross-sectional view showing the configuration of the inside of the housing 400 of the projector 200 according to this embodiment. Note that, the projection unit 500 which is housed in the housing 400 is also shown by a cross-sectional view. As shown in FIG. 14, the projection unit 500 is provided with a unit housing 510 which is fixed in place with respect to the housing 400. Inside of this unit housing 510, an LED 512, focusing lens group 514, PBS (polarized beam splitter) 516, normally black type LCOS (reflection type liquid crystal device) 518, projecting lens group 530, and mirror 532 are arranged.

The projected light which is emitted from the LED 512 is converted by the focusing lens group 514 to parallel light, then strikes PBS 516 and strikes a polarized light separation film 516a which is provided at an angle of 45° with respect to the direction of progression of the incident light. In the incident projected light, only the S polarized light is reflected by the polarized light separation film 516a, is emitted from the bottom surface of the PBS 516 downward, then and strikes the image display unit which is set below the PBS 516 constituted by the LCOS 518. On the other hand, the P polarized light which passes through the polarized light separation film 516a strikes the side surfaces of the PBS 516, which have been blackened or otherwise treated to be non-reflective, and is absorbed.

The light striking the LCOS 518 is reflected by the LCOS 518 and again strikes the PBS 516. Here, a not shown liquid crystal layer forming the LCOS 518 functions as a phase plate with respect to the incident light when voltage is applied. Therefore, in the light which is emitted from the LCOS 518, light which passes through a pixel region to which voltage is applied from the liquid crystal layer is converted from S polarized light to P polarized light. On the other hand, in the light which is emitted from the LCOS 518, light which passes through a pixel region to which voltage is not applied from the liquid crystal layer proceeds as is as S polarized light.

In the light which is emitted from the LCOS 518 and again strikes the PBS 516, only the P polarized light which passes through a pixel region of the LCOS 518 where voltage is applied passes through the polarized light separation film 516a and is thereby separated from the S polarized light. That P polarized light is emitted from the PBS 516 upward, then passes the projecting lens group 530 for projecting the optical image for projection and the mirror 532 for deflecting the direction of projection of the optical image, then is emitted from the projection unit 500 and is projected through the projection window 800 which is provided at the front surface of the housing 400 of the projector 200 to the front of the projector 200. Note that, the mirror 532 is comprised of a curved mirror having a predetermined curvature rate so that the projected image P which is formed on the projection surface A can be corrected by keystone correction.

Further, as shown in FIG. 14, at the bottom of the inside of the housing 400, a power supply 534 which feeds power to the LED 512 in the unit housing 510 etc. is provided. If arranging a heavy object like the power supply 534 at the bottom of the inside of the housing 400, the position of the center of gravity of the projector 200 shifts downward, so it is possible to further stabilize the projector 200 at the time of setting. Further, by arranging the power supply 534 inside of the housing 400, it is possible to make the position of the center of gravity, which moved to the front of the projector 200 due to the provision of the cover 140 at the front surface 600 of the housing 400, move toward the center of the housing 400 and possible to make the vertical line extending from that center of gravity downward pass through the inside of the placement surface of the housing 400 (bottom surface 120). By moving the center of gravity of the projector 200 in this way, it is possible to stably set the projector 200.

According to the projector 200 according to the fourth embodiment, the front surface 600 of the housing 400 is provided with the cover 140 which is provided able to slide in the vertical direction, so when setting the housing 400 on the projection surface A for projecting an image, it is possible to make the cover 140 move to the lowest most position and make the bottom end face of the cover 140 abut against the projection surface A. By using the cover 140 in this way so as to complementarily support the housing 400, it is possible to more stably set the projector 200. Further, according to the projector 200 according to this embodiment, the power supply 534 or other heavy object is arranged at the bottom of the inside of the housing 400, so the position of the center of gravity of the projector 200 moves downward and the vertical line which extends from that center of gravity downward passes through the placement surface of the housing 400. Therefore, it becomes possible to stably set the projector 200 on the projection surface A.

Next, referring to FIG. 15 and FIG. 16, a projector 102 embodying the projection apparatus according to a fifth embodiment of the present invention will be explained. Note that, this projector 102 is provided with a cover of a different shape from the cover 140 which is provided at the projector 200 according to the fourth embodiment, but aside from this point is provided with a configuration similar to the configuration provided by the above-mentioned projector 200. Therefore, in the explanation of the projector 102, explanations of parts of the configuration similar to the projector 200 are omitted and the same reference notations are used.

Figure 15:
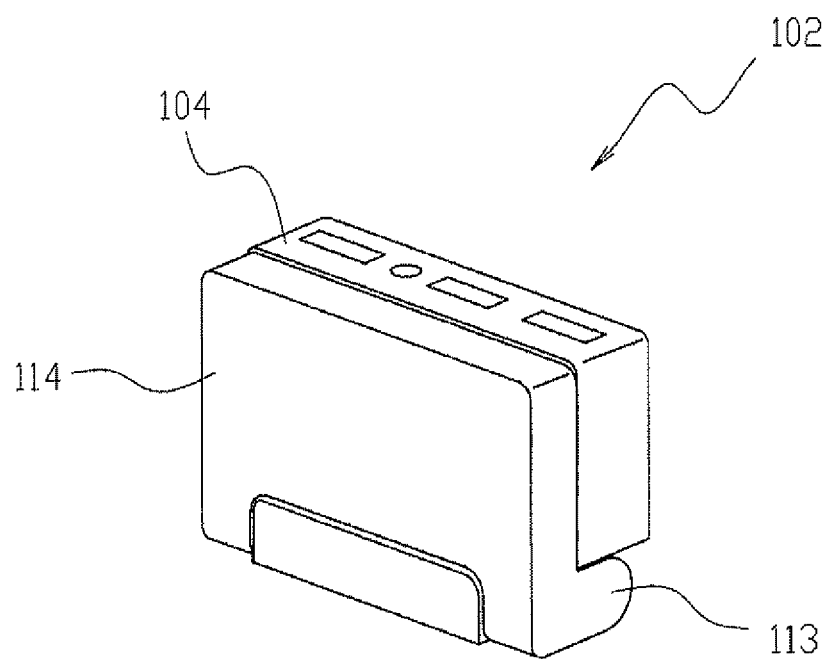
FIG. 15 is a perspective view showing the appearance of a projector according to a fifth embodiment at the time of non-image projection.

FIG. 15 is a perspective view showing the appearance of the projector 102 at the time of non-image projection. As shown in FIG. 15, the projector 102 has a housing 104 which is provided inside it with the projection unit 500. This housing 104 is provided with shaft parts 113 at the bottom at the left and right side surfaces. Further, at the shaft parts 113, a cover 114 constituting a protective member which protects the front surface of the housing 104 is pivotally provided. As shown in FIG. 15, when an image is not being projected, the cover 114 is positioned at a storage position where it completely closes the front surface 106 of the housing 104 (see FIG. 16) and thereby protects the front surface 106 and the projection window 800 which is provided at the front surface 106 (see FIG. 16).

Figure 16:
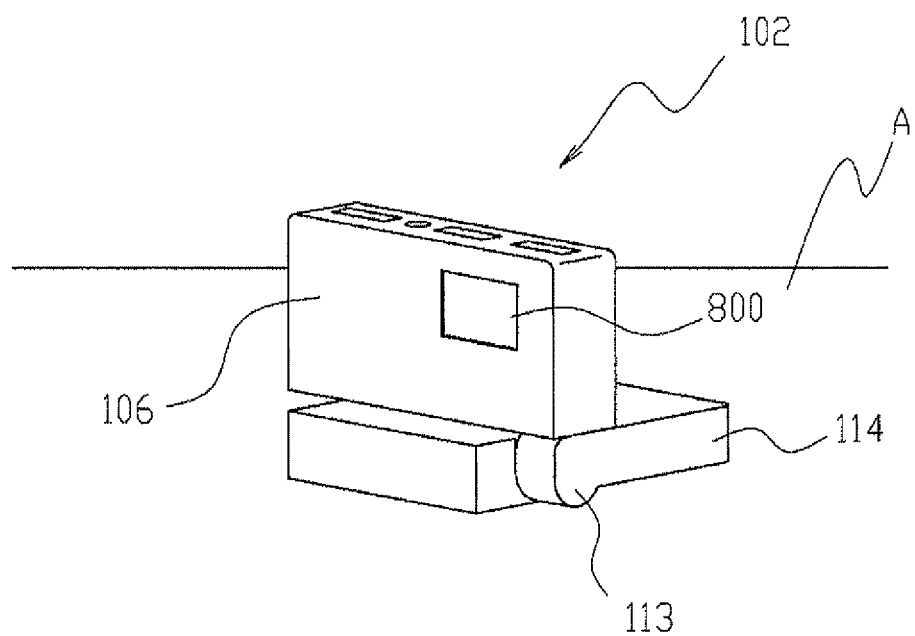
FIG. 16 is a perspective view showing the appearance of a projector according to the fifth embodiment at the time of image projection.

On the other hand, as shown in FIG. 16, which is a perspective view showing the appearance of the projector 102 at the time of image projection, when using the projector 102 to project an image, the cover 114 which is positioned at the storage position is made to rotate about 270° about the shaft parts 113 to place it at the projection position shown in FIG. 16. If placing the cover 114 at the projection position, the projection window 800 which is provided at the front surface 106 of the housing 104 is exposed, so it is possible to project an image toward the front of the projector 102. Further, if setting the housing 104 on the projection surface A in the state with the cover 114 placed at the projection position, the cover 114 will abut against the projection surface A, so it is possible to complementarily support the housing 104 which is set on the projection surface A.

According to the projector 102 according to the fifth embodiment, by placing the cover 114 at the projection position and making the cover 114 abut against the projection surface A, it is possible to complementarily support the housing 104 and more stably set the projector 102.

Figure 17:
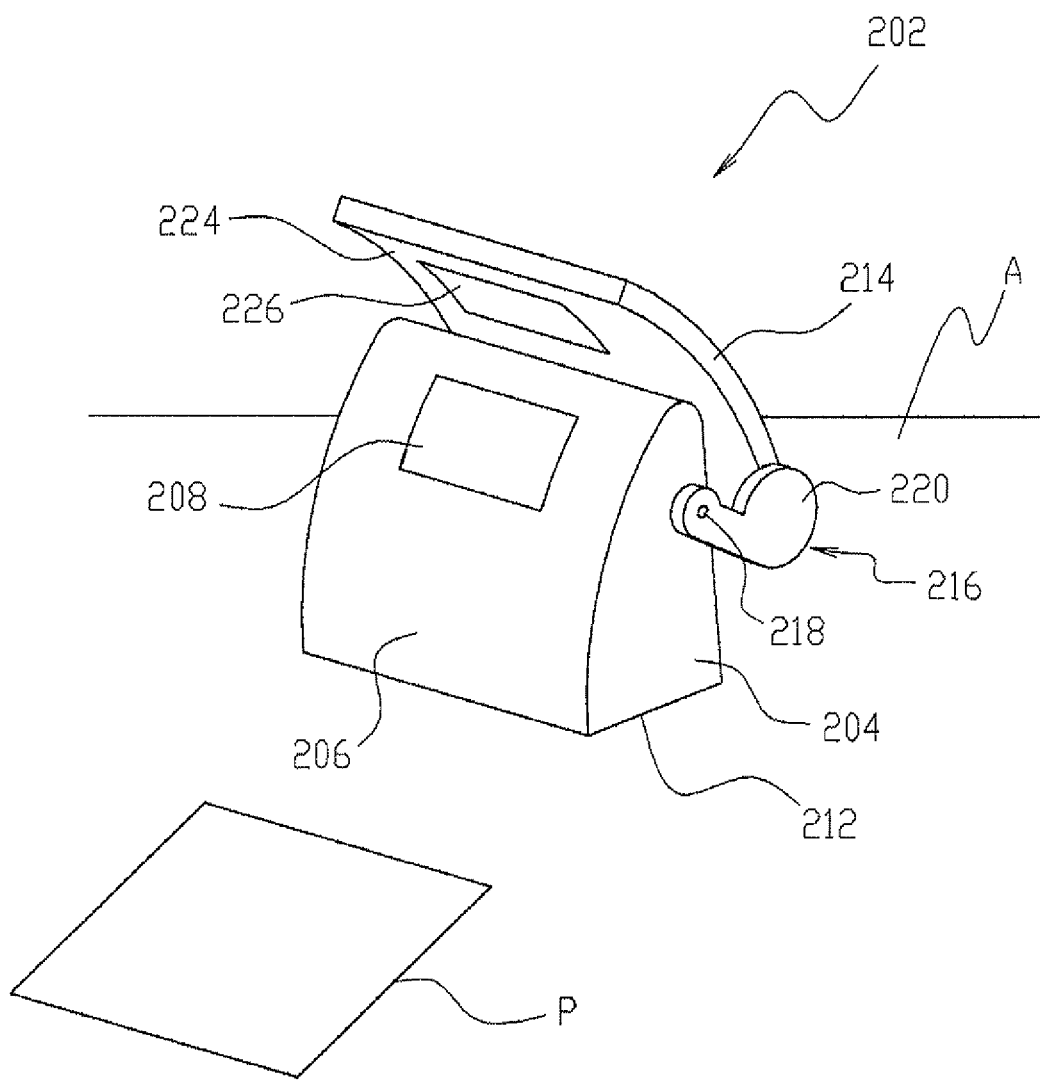
FIG. 17 is a perspective view showing the appearance of a projector according to a sixth embodiment at the time of image projection.

Next, referring to FIG. 17 to FIG. 20, a projector 202 embodying the projection apparatus according to a sixth embodiment of the present invention will be explained. FIG. 17 is a perspective view showing the apparatus of the projector 202 at the time of image projection. As shown in FIG. 17, at the front surface 206 of the housing 204 provided at the projector 202 which is set on the projection surface A, a projection window 208 is provided. Through this projection window 208, projected image P is projected on to the projection surface A. Note that, the operating panel for setting functions of the projector 202 etc. is placed at the back surface of the housing 204. Further, the bottom surface 212 of the housing 204 is contiguous with the placement surface constituted by the projection surface A. Further, the configuration of the inside of the housing 204 is similar to the configuration of the inside of the housing 400 provided at the projector 200 according to the fourth embodiment. A projection unit 500 and power supply 534 are housed there.

As shown in FIG. 17, the projector 202 is provided with a cover 214 which is supported by a pair of support arms 216 which are arranged at the left and right side surfaces of the housing 204. The support arms 216 are arranged pivotally at the side surfaces of the housing 204 through shafts 218 running through first ends of the same. Further, the other ends of the support arms 216 are provided with cover supports 220 which support the cover 214. Note that, the cover 214 is provided with a weight part 222 (see FIG. 18) which extends in the left-right direction of the cover 214 near the end supported by the cover supports 220. Further, the cover 214 is provided at its inside surface 224 with a cover mirror 226 which reflects an image which is projected from the projection window 208 and projects the projected image P to the projection surface A. When using the projector 202 to project an image, the cover 214 is placed at the projection position shown in FIG. 17 so as to expose the projection window 208 and reflect the image which is projected from the projection window 208 by the cover mirror 226. Note that, when the cover 214 is placed at the projection position, the part of the cover 214 where the cover mirror 226 is set sticks out to the front of the housing 204, but as explained later, the cover 214 is provided with the weight part 222, so that state is stably held. Further, the housing 204 of the projector 202 never becomes off balanced.

Figure 18:
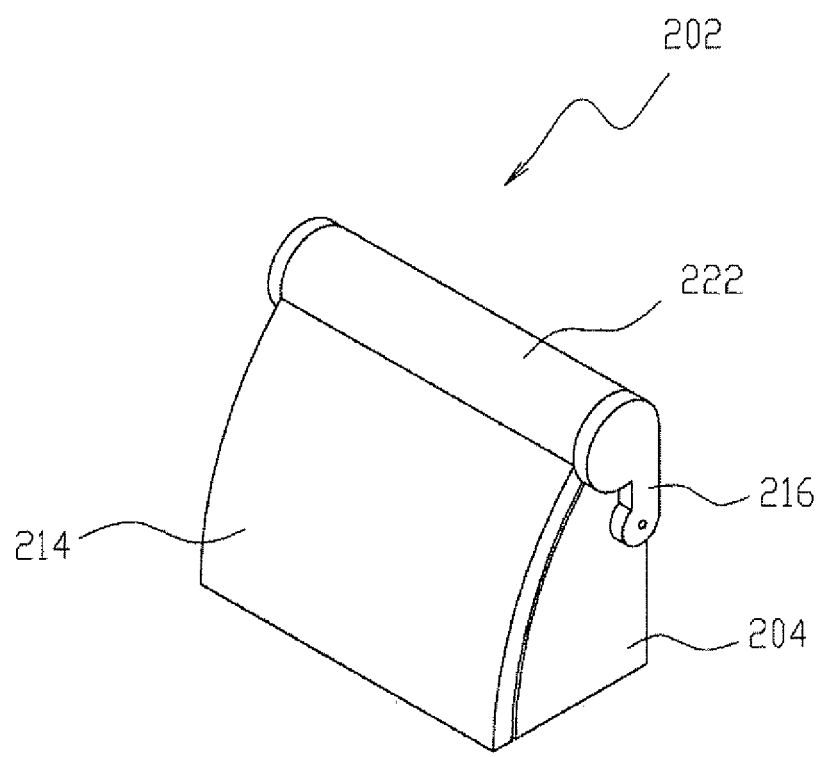
FIG. 18 is a perspective view showing the appearance of a projector according to the sixth embodiment at the time of non-image projection.

On the other hand, as shown in FIG. 18, which is a perspective view showing the appearance of the projector 202 at the time of non-image projection, when not projecting an image, the cover 214 is placed at the storage position where it closes the front surface 206 of the housing 204 and protects the projection window 208 which is set at the front surface 206. Therefore, the user of the projector 202 can safely carry the projector 202 around.

Figure 19:
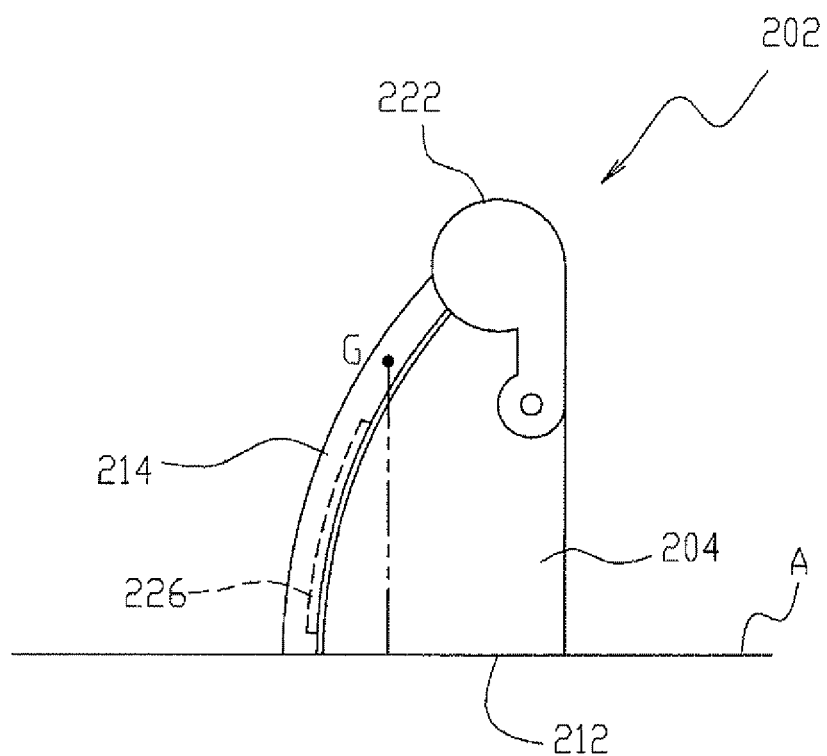
FIG. 19 is a view explaining a position of a center of gravity of a cover provided at a projector according to the sixth embodiment.

Next, the position of the center of gravity of the cover 214 will be explained using FIG. 19 and FIG. 20. The cover 214 is provided with the cover mirror 226 at the bottom side in FIG. 19 and is provided with the weight part 222 at the end at the top side. Therefore, as shown in FIG. 19, the center of gravity G of the cover 214 is positioned close to the end where the weight part 222 is provided. When the cover 214 is positioned at the storage position, the center of gravity G is at that position, so the vertical line extending from center of gravity G downward passes through the placement surface of the housing 204, that is, the bottom surface 212. Therefore, the housing 204 can stably hold the cover 214 at the projection position.

Figure 20:
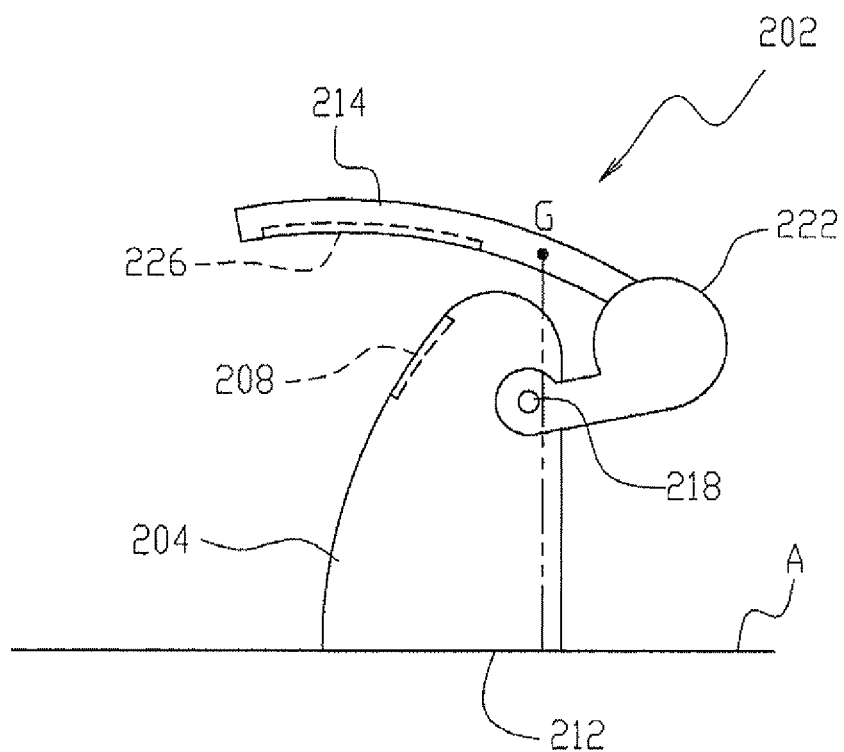
FIG. 20 is a view explaining a position of a center of gravity of a cover provided at a projector according to the sixth embodiment.

On the other hand, when the projector 202 projects an image, as shown in FIG. 20, the cover 214 is rotated about the shafts 218 clockwise in the figure and positioned at the projection position. In this case as well, the vertical line extending from center of gravity G of the cover 214 downward passes through the bottom surface 212 of the housing 204. Therefore, the housing 204 can stably hold the cover 214 at the projection position.

According to the projector 202 according to the sixth embodiment, since a cover 214 is provided which is supported by support arms 216 which are set at the housing 204 and a cover mirror 226 is provided on the inside surface 224 of this cover 214, it is possible to reflect an image which passes through the projection window 208 at the cover mirror 226 and project a good projected image on the projection surface A. Further, according to the projector 202 according to this embodiment, the cover 214 is provided with the weight part 222 at one end, so the vertical line which extends down from the center of gravity G of the cover 214 which is placed at the projection position passes through the bottom surface 212 of the housing 204. Therefore, the housing 204 can be set on the projection surface A in the state with the cover 214 stably held at the projection position.

Next, referring to FIG. 21, a projector 302 embodying the projection apparatus according to a seventh embodiment of the present invention will be explained. Note that, this projector 302 is provided with the same configuration as the projector 200 according to the fourth embodiment, but differs in the point that additional members are attached to the housing 304 of the projector 302 so as to complementarily support the housing 304. Note that, the projector 302, other than this point, is provided with a similar configuration to the configuration provided by the above-mentioned projector 200, so in the explanation of the projector 302, explanations of parts of the configuration similar to the projector 200 are omitted and the same reference notations are used.

Figure 21:
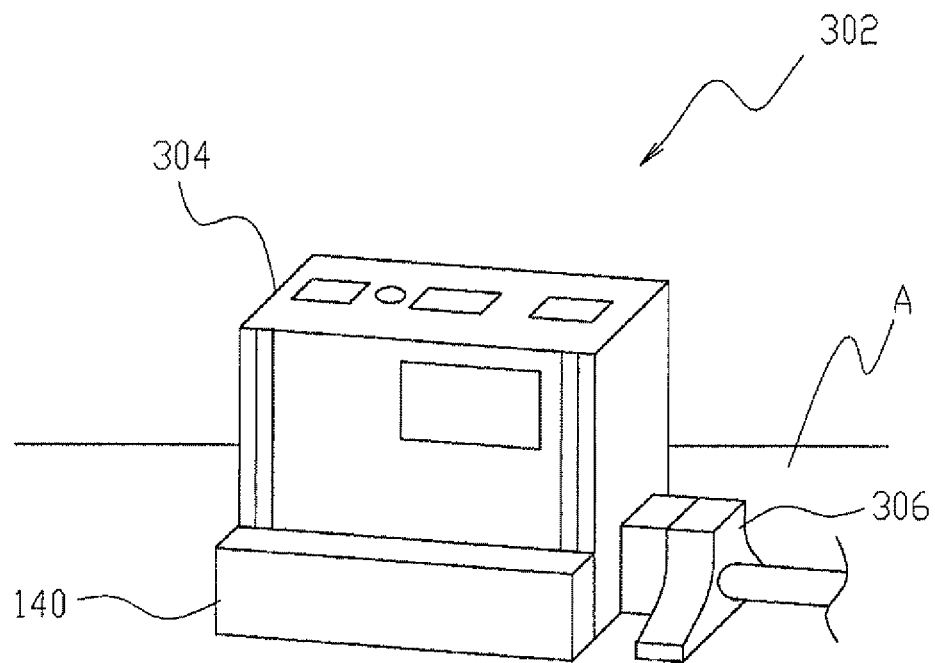
FIG. 21 is a perspective view showing the appearance of a projector according to a seventh embodiment at the time of image projection.

FIG. 21 is a perspective view showing the appearance of the projector 302 at the time of image projection. As shown in FIG. 21, a housing 304 which is provided at the projector 302 which is set on the projection surface A is supported by a cover 140 which has been moved to the lowest position on the front surface of the housing 304. Further, at one side surface of the housing 304, a not shown connector mount is provided. A connector 306 to which a power cable or data transfer cable is connected is attached to this. This connector 306 has a shape which for example becomes broader toward the bottom surface contiguous with the projection surface A so as to be able to complementarily support the housing 304 which is set on the projection surface A. Therefore, according to the projector 302 according to this embodiment, even when a power cable etc. is attached and therefore the weight balance of the housing 304 changes, by attaching a connector 306 having such a shape and complementarily supporting the housing 304, it is possible to stably set the housing 304 on the projection surface A. Note that, to use the connector 306 to more reliably support the housing 304, it is also possible to provide a suction cup etc. at the bottom surface of the connector 306 to fix the connector 306 on the projection surface A.

REFERENCE SIGNS LIST

2, 50, 70 . . . projector, 4, 61, 71 . . . housing, 8, 77 . . . projection window, 30, 40 . . . projection unit, 62 . . . imaging window, 75 . . . mirror, F . . . front region, G . . . horizontal surface, H . . . wall surface, P . . . projected image.

The invention claimed is:

1. A projection apparatus comprising:
   a projection unit having an optical system that projects an image,
   a housing that houses the projection unit,
   an imaging unit that captures a projection surface on which the image is projected, and
   a projection region determining unit that determines a projection region on which the image can be projected by the projection unit, by use of a captured image of the projection surface captured by the imaging unit, wherein
   a surface of the housing that is used as a placement surface when setting the housing is parallel to the projection surface, and
   the projection unit performs an expansion and contraction process on an image projected on the projection surface while fixing in place one side closest to the housing within a region on which the projection unit can project the image on the projection surface, and projects the image onto the projection region, the expansion and contraction process being performed by processing an image signal.

2. The projection apparatus according to claim 1, wherein the housing has
   a first surface, provided on the housing, that functions as a distance reference surface that defines a distance from a projection window that the housing is provided with to a projection surface that projects the image and as a first placement surface that is used when setting the housing, and
   a second surface, provided on the housing, that perpendicularly intersects the first surface and functions as a second placement surface when setting the housing.

3. The projection apparatus according to claim 1, wherein optical members that constitute the optical system are fixed in place with respect to the projection unit in a state where the image is being projected.

4. The projection apparatus according to claim 1, wherein the housing is set so that, at the time of the image projection, the distance reference surface and the projection surface become parallel.

5. The projection apparatus according to claim 1, wherein the projection unit has an optical system of an oblique incidence type including a projection lens and a mirror and
   at least single surfaces of the optical members forming part of the optical system are free form curved surfaces.

6. The projection apparatus according to claim 1, wherein a reflecting surface of the mirror forming part of the optical system is a convex and free form curved surface.

\* \* \* \* \*